(12) United States Patent
Crichlow (10) Patent No.: US 7,098,783 B2
(45) Date of Patent: Aug. 29, 2006

(54) SYSTEM AND METHOD FOR REAL TIME GENERATING, PRESENTING, DISPLAYING AND PAYING UTILITY BILLS ONLINE

(76) Inventor: Henry B. Crichlow, 716 Jona Kay Ter., Norman, OK (US) 73069

( * ) Notice: Subject to any disclaimer, the term of this patent is extended or adjusted under 35 U.S.C. 154(b) by 112 days.

(21) Appl. No.: 10/709,773

(22) Filed: May 27, 2004

(65) Prior Publication Data

US 2004/0243524 A1 Dec. 2, 2004

Related U.S. Application Data (60) Provisional application No. 60/474,851, filed on Jun. 2, 2003.

(51) Int. Cl.
*G08B 1/00* (2006.01)
*G06Q 99/00* (2006.01)
(52) U.S. Cl. .................. 340/531; 340/870.02; 705/52; 705/63
(58) Field of Classification Search ................ 340/531; 705/63
See application file for complete search history.

(56) References Cited

U.S. PATENT DOCUMENTS 5,699,276 A 12/1997 Roos 6,618,709 B1 9/2003 Sneeringer
2002/0018545 A1* 2/2002 Crichlow ............... 379/106.03

* cited by examiner

*Primary Examiner*—Donnie L. Crosland
(74) *Attorney, Agent, or Firm*—Richard D. Fuerle (57) ABSTRACT

A system for continuously providing information on the internet of the usage of a utility commodity at a meter includes an internet site at which the usage of the utility commodity at the meter can be viewed and at which a utility company can post pricing information for the use of the utility commodity at the meter. An automatic meter reader provides continuous information on the quantity of the utility commodity that is being used at the meter and information is transmitted between the automatic meter reader and the internet site. The utility company sends pricing information to the automatic meter reader and, using the pricing information, the automatic meter reader continuously calculates charges for utility usage and sends those charges to the internet site, where they are posted. The automatic meter reader can generate, present, and display real time energy use data and energy billing and can allow the customer the option of paying the bill online or at the automatic meter reader.

24 Claims, 13 Drawing Sheets

ELECTRIC SERVICE BILL
OGE
CRAWFORD ST.
NORMAN, OKLAHOMA 73069

*OG&E*

| Customer Name | Service address |
|---|---|
| ILA MATHEWS | 330 W Gray St, Norman, OK. |

| BILLING PERIOD | | METER READINGS | | METER CONSTANT | KILOWATT HOURS | ACCOUNT NUMBER |
|---|---|---|---|---|---|---|
| From | To | Previous | Present | | | |
| 04/29/00 | 05/30/00 | 45470 | 46066 | 1 | 596 | 761460-5 |

RESIDENTIAL RATE

| | |
|---|---|
| CHARGE FOR ELECTRIC SERVICE | $ 51.17 |
| FRANCHISE FEE | $ 1.54 |
| SALES TAX | $ 1.58 |
| CURRENT BILL | $ 54.29 |

FUEL ADJ. FACTOR
$0.000868/KWH

TOTAL AMOUNT DUE     $ 54.29

A LATE PAYMENT CHARGE OF $0.81 (1.5%) WILL BE ADDED
IF PAYMENT IS NOT RECEIVED BY 06/21/2000

Pay all of Bill     Click Here

Pay part of Bill $ [    ]     Click Here

E-Mail Question or Comment to Utility     Click Here

Close Window

Possible Modes

I   Server mode - meter device reads data and sends to server to compute, & display bill as webpage on company server.

II  Client mode - meter device computes bill, displays bill online as webpage at meter site. Client meter behaves like a microserver device.

III Hybrid Server mode - Meter device computes bill, send info to server for display and bill payment. Bill is displayed at both meter site and company server site.

Fig. 7

I — Server Based - bill is computed, presented, stored, displayed and paid at company server

| Step | Action Implemented |
|---|---|
| 1 | Meter energy use data is obtained by metering device |
| 2 | Usage data sent via isp and internet to company server |
| 3 | Company server selects the appropiate billing algorithm |
| 4 | Company server program computes bill |
| 5 | Bill data is converted to HTML or XML code |
| 6 | Bill data is displayed on website as online bill |
| 7 | Process loops continuously from 1 through 6 to provide real time updating of billing data |
| 8 | Customer logs on to website |
| 9 | Customer reads bill online |
| 10 | Customer decides to pay bill online or pay via offline channels like mail |

Fig. 8

II    Client Based - bill is computed, presented, stored, displayed and paid at meter microserver

| Step | Action Implemented |
|---|---|
| 1 | Meter energy use data is obtained by intelligent metering device |
| 2 | Billing algorithm is coded into program at meter site |
| 3 | Client device computes bill |
| 4 | Bill data is sent to company server via internet and stored on company server as backup |
| 5 | Bill data is converted to HTML or XML code at client microserver |
| 6 | Bill data is displayed online at webpage on client microserver |
| 7 | Process loops continuously from 1 through 6 to provide real time updating of billing data |
| 8 | Customer logs on to website via internet |
| 9 | Customer reads bill online at meter microserver |
| 10 | Customer decides to pay bill online or pay via offline channels like mail |

Fig. 9

| III | Hybrid Based - bill is computed, presented, stored, displayed and paid at company server and or meter site. |
|---|---|
| Step | Action Implemented |
| 1 | Meter energy use data is obtained by intelligent metering device |
| 2 | Billing algorithm is coded into computer software at meter site |
| 3 | Client device computes bill, behaves like a micro-server |
| 4 | Action (1) |
| 5 | Computed bill data is sent to company server via internet |
| 6 | Computed bill data is converted to HTML or XML code on company server |
| 7 | Computed bill data is displayed on website as online bill on company server |
| 8 | Action (2) |
| 9 | Computed bill Data is stored at client meter site |
| 10 | Computed bill data is converted to HTML or XML code on client meter site |
| 11 | Computed bill data is displayed on website at meter microserver as online bill |
| 12 | Process loops continuously from 1 through 11 to provide real time updating of billing data |
| 13 | Customer logs on to internet and finds websites at meter or at company URL locations |
| 14 | Customer reads bill online either at company server or at meter microserver itself |
| 15 | Customer decides to pay bill online or pay via offline channels like mail |

*Fig. 10*

PRICES:

Customer Charge:  $6.50 per customer per month

Time-of-Use Meter Charge:  $6.00 per customer per month for five Summer Season months.

Energy Charge:

Summer Season:  The five OG&E Revenue Months of June through October.

On-Peak Hours: 20.55c per kWh per month. From June 1 through September 30, beginning each day at 1:01 PM through 7:00 PM local time, excluding Saturdays, Sundays, Independence Day (as observed) and Labor Day.

Off-Peak Hours: 3.18c per kWh per month. All hours not defined as On-Peak hours.

Winter Season:  The seven OG&E Revenue Months of November through May of the succeeding year.

First 600 kWh per month: 7.8 c per kWh.
All additional kWh per month: 3.18c per kWh.

Fig. 11

| | | |
|---|---:|---|
| Customer Charge/Month | $6.50 | (a) |
| TOU Meter Charge/Month | $6.00 | (b) |

Energy Charge - Summer Season

| | | | |
|---|---:|---|---|
| On Peak Hours Costs | $0.2055 | KwHr/Mo | (c) |
| Off Peak Hours Cost | $0.0318 | KwHr/Mo | (d) |

Energy Use

| | | | |
|---|---:|---|---|
| On Peak Hours KwHr | 2,345 | KwHr | (e) |
| Off Peak Hours KwHr | 488 | KwHr | (f) |
| Total Energy Use | 2,833 | KwHr | (g) |

Energy Costs

| | | |
|---|---:|---|
| Off Peak Use | $481.90 | (h) |
| Off Peak Use | $15.52 | (i) |
| Total Energy | $497.42 | (j) |

| | | |
|---|---:|---|
| Total Costs = | $509.92 | (k) |

Calculation Algorithm : (k) = (a) + (b) x [ (e) x (c) + (f) x (d) ]

SYSTEM AND METHOD FOR REAL TIME GENERATING, PRESENTING, DISPLAYING AND PAYING UTILITY BILLS ONLINE

CROSS REFERENCE TO RELATED APPLICATIONS

This application claims priority from provisional application No. 60/474,851, filed Jun. 2, 2003 by Dr. Henry Crichlow. This application is also related to pending U.S. Patent Application Publication No. US2002/0018545A1 for "Method and Apparatus for Reading a Meter and Providing Customer Service Via the Internet," Ser. No. 10/016,049 for "Method and System for Establishing Internet Websites for Utility Meters Allowing Utility Meters to be Read Over the Internet," and Ser. No. 10/033,667 for "Method and System for Energy Management Using Intelligent Agents Over the Internet."

BACKGROUND OF INVENTION

This invention relates to a system for continuously providing information on the internet of the power usage at a utility's electric meter. In particular, it relates a system where there is an internet site at which the power usage at the meter can be viewed and at which the utility company can post pricing information for the use of power at said meter, an automatic meter reader that provides continuous information on the power being used at the meter, means for sending information between said automatic meter reader and the internet site, so that the utility can send pricing information to the automatic meter reader and, using that pricing information, the automatic meter reader continuously calculates charges for power usage and can send those charges to the internet site where they can be posted.

The electric utility industry is a major industry nationally and worldwide. It collects several hundred billion dollars annually in revenues. The major focal point in the system is the energy usage bill generated monthly for each user. For the industry, the meter is the cash register that allows the utility to bill and collect revenue from the users, usually on a monthly basis. Hundreds of millions of dollars are spent annually by the utilities to generate, mail out, and collect their bills. This facet of the operation is a capital and labor-intensive operation and streamlining the operation and making the billing operations more efficient would save substantial amounts of money.

The advent of the internet has made it possible for bills to be displayed and paid on the internet, making the billing operation cheaper and more productive for both the company and the customer. The internet is especially conducive to conducting electronic transactions and the design, ubiquitous nature and standard interfaces, i.e. browsers, of the internet make this medium ideally suited for paying bills.

Recently, improvements have been made in the billing process using the internet. Information on power usage that has been collected manually or remotely by the utility is used to compute the customer's monthly bill. The bill is displayed on the company's website so that the user may view it and pay it online if he wishes to. But even when a utility has installed an automatic meter reading (AMR) system at the customer's site, the bill is calculated periodically, normally once each month, but occasionally at shorter intervals. Most or all of the prior billing inventions focus primarily on the last leg of the utility billing chain, the bill presentment phase. The meter phase systems to date either provide information only on a daily update and only in the case of extremely expensive commercial and industrial systems is data available in real time to the individual customers. There is no residential system which can provide real time data today. There is a major need for the integration of the metered data, its collection, recognition, storage, energy use tariff selection, and eventually its presentment and display. It would be advantageous for some customers, however, if they could know on a continuous basis what they owe for power being used so that they can alter operations accordingly. This is especially true when a utility has different rates at different times of the day or during peak usage. In addition, continuous billing may help to detect the theft of power or the loss of power due to shorts or the loss of insulation.

DESCRIPTION OF PRIOR ART

U.S. Pat. No. 5,699,276 describes a utility meter interface apparatus which has a standard computer system of some size and complexity and a utility meter both connected between a utility company and customer. This significant computer is connected to the utility meter and provides an interface between a communication network and a device located inside the home. The computer can communicate with the interface in several different forms.

U.S. Pat. No. 5,699,528 presents a bill delivery and payment system whereby users access a server computer on a communications network like the Internet to obtain bill information and pay bills. The patent also indicates the use of email to provide bill information.

In U.S. Pat. No. 6,578,015, there is disclosed a computer-implemented method of presenting an electronic bill from a biller to a customer over a computer network from a payment database.

U.S. Pat. No. 6,618,709 provides a very complex method, process and computer architecture which can monitor resource usage via a global computer network including the use of databases, associated resource meters, recorders and communications systems.

U.S. Pat. No. 6,385,595 by Visa discusses an electronic statement presentment (ESP) system which replaces the preparation and mailing of paper statements and invoices from a biller with electronic delivery.

Patent WO02061536 First USA Bank describes a bill payment system and method that enables a customer payor to make payment to a payee in a networked environment using a credit card, revolving credit, or other credit account. The payment system may provide for online receipt and review of bills, and may allow a customer payor to optionally select one or more alternative secondary accounts for payment in the event that payment cannot be made from a primary account.

Existing companies Ibill.com (www.ibill.com), and Transpoint.com (www.transpoint.com), have developed bill presentment processes. In these processes, the billing company essentially takes a company's paper bill that has been previously computed and makes an electronic equivalent which it displays online in HTML or similar format. The customer can log on to the internet, see the bill, and elect to pay it in some predetermined manner. The presenting company essentially replaces the U.S. Post Office as an intermediary between the utility company and its customer. The bill presented is updated once a month.

Credit card companies, (e.g., www.visa.com and www.mastercard.com) have long had the ability to update the purchases of their customers in real time to monitor usage and to control potential abuse and fraud. The need in the utility industry is not as critical but there is still a great desire to minimize costs and to provide better customer services. An additional demand in the electric power industry arises from the new industry practice where the power company's tariffs are based on the time of use (TOU pricing). This development creates the need for a real time billing process to help the customer optimize energy use by shifting power use to low cost time periods and to allow the utility to schedule power generation and distribution more economically.

Ameresco (www.ameresco.com/e-supply_compservices.asp), a service company, proposes a system which gathers and analyses information about energy use and allows the customer to process and pay utility bills online. This system gathers the data from the utility and allows the customer to access data and print reports through a secure Internet site.

Duke Energy, a Houston electric utility, allows its customers to read their energy use daily at a secure website. In the optimal situation, the system allows the user to see data updated at 15 minute intervals.

SUMMARY OF INVENTION

This invention provides an improvement in utility billing technology whereby information is available in real time showing the consumer the instantaneous use of energy and its costs. The user can then modify and control the use of energy more effectively and thereby control costs and use the power he purchases more efficiently. Real time cost information is becoming increasing important because the expectation in the industry is that power use will be deregulated and energy costs will vary with time of use (TOU pricing), e.g., energy will cost more in peak times. Because prices can change hourly for commercial and industrial customers, it is critical that both the user and the seller of power have access to real time data continuously, the user for cost minimization and the seller for planning.

This invention allows the orderly development and expansion of the utility industry and for better strategic planning and implementation nationally since both utilities and consumers will have a better control of their energy utilization.

This invention allows the customer to be alerted when certain prescribed limits on use are reached during the month so that the consumer can react and plan. By implementing the processes of this invention, a bill can be generated from real time data, the bill can be displayed online and both the user and the utility can be aware of energy use and energy costs simultaneously. The user can have the option of paying the bill at any time.

This invention addresses the full energy use chain from electric flow quantification at the meter to bill computation, bill presentment, and bill payment, and provides an economical, efficient, and easily deployable method and process. An embodiment of the present invention provides a method and a system for obtaining energy use data from a customer meter and displaying the computed electric bill online in real time as a webpage.

A further objective of this invention is to provide a means whereby the customer energy use can be displayed online as a webpage.

Another specific objective is to provide a means whereby this web page can be displayed by using hyper text markup language (HTML) code or extensible markup language (XML) code for a browser to view.

Another specific objective is to provide a means whereby the webpage is presented and displayed at the company website on the company server.

Another specific objective is to provide a means whereby the webpage is presented and displayed using the same identical universal resource locator (URL) to locate the online bill even though the IP address of the AMR device and the actual webpage may change with time.

Another specific objective is to provide a means whereby the webpage is presented and displayed at the individual customer meter in which the customer intelligent meter behaves as a micro-server.

Another specific objective is to provide a means whereby the online bill can be displayed and made available at both the company server and the individual customer meter site simultaneously.

Another specific objective is to provide a means whereby the energy use data is updated continuously online in real time.

Another specific objective is to provide a means whereby the energy bill is updated continuously online in real time.

Another specific objective is to provide a means whereby the energy user can be alerted if there are changes in use his patterns and violations of his preset use limits.

Another specific objective is to provide a means whereby the customer has the option to pay the bill online.

DETAILED DESCRIPTION

The present invention provides a method and system for acquiring real time meter data from a customer meter and making this data available online showing a real time usage webpage and also an online bill which can be paid online or offline by the customer/user. By "real time" it is meant that the data is presented with no more than a 60 minute delay from the time it is generated, preferably with no more than 5 minute delay, and most preferably with no delay.

This invention connects the user and the generator more closely and allows an integration of the power industry in a manner which heretofore has been unavailable and provides for a paradigm shift in efficiencies for the customer and the generator.

The invention can be applied in several embodiments. There are 3 possible modes for practicing the system of this invention, but these do not limit the possible methodologies in which the system can be implemented. A person versed in the technology can see additional combinations and permutations of these applications.

Figure 7:
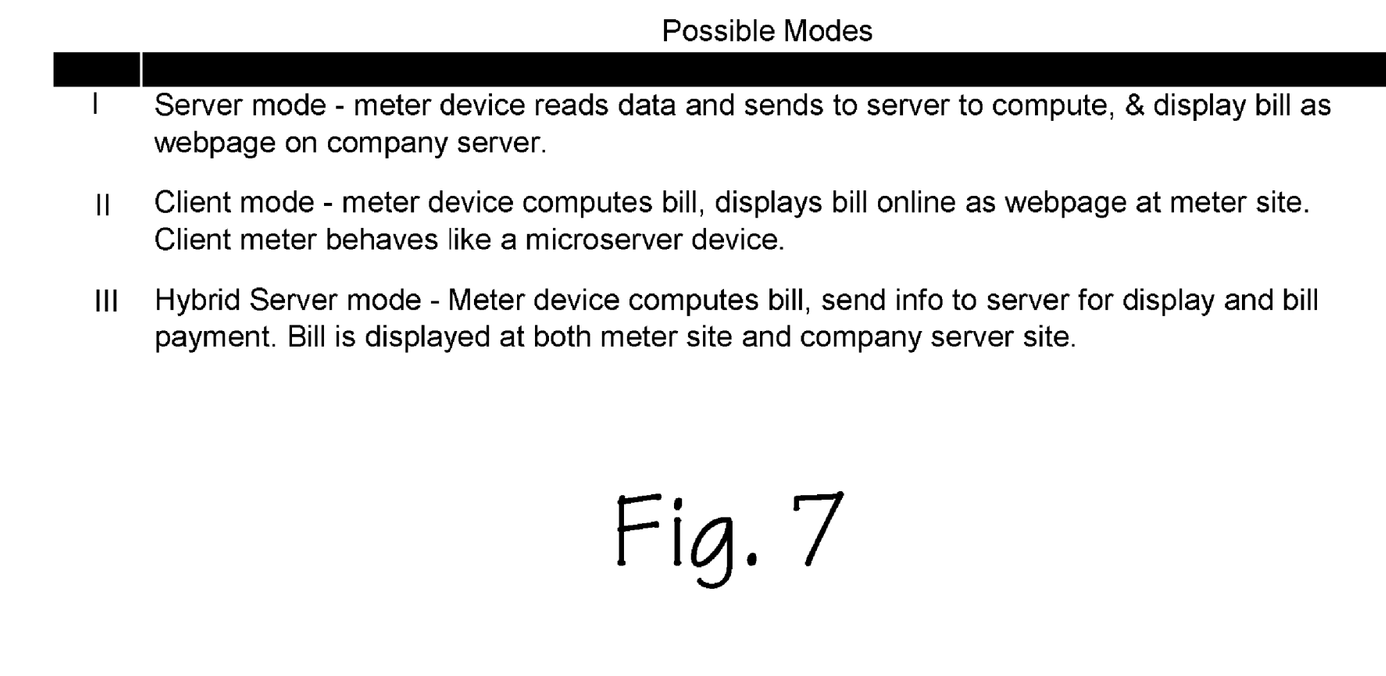
FIG. 7 shows 3 possible modes of operation of this invention.
Figure 8:
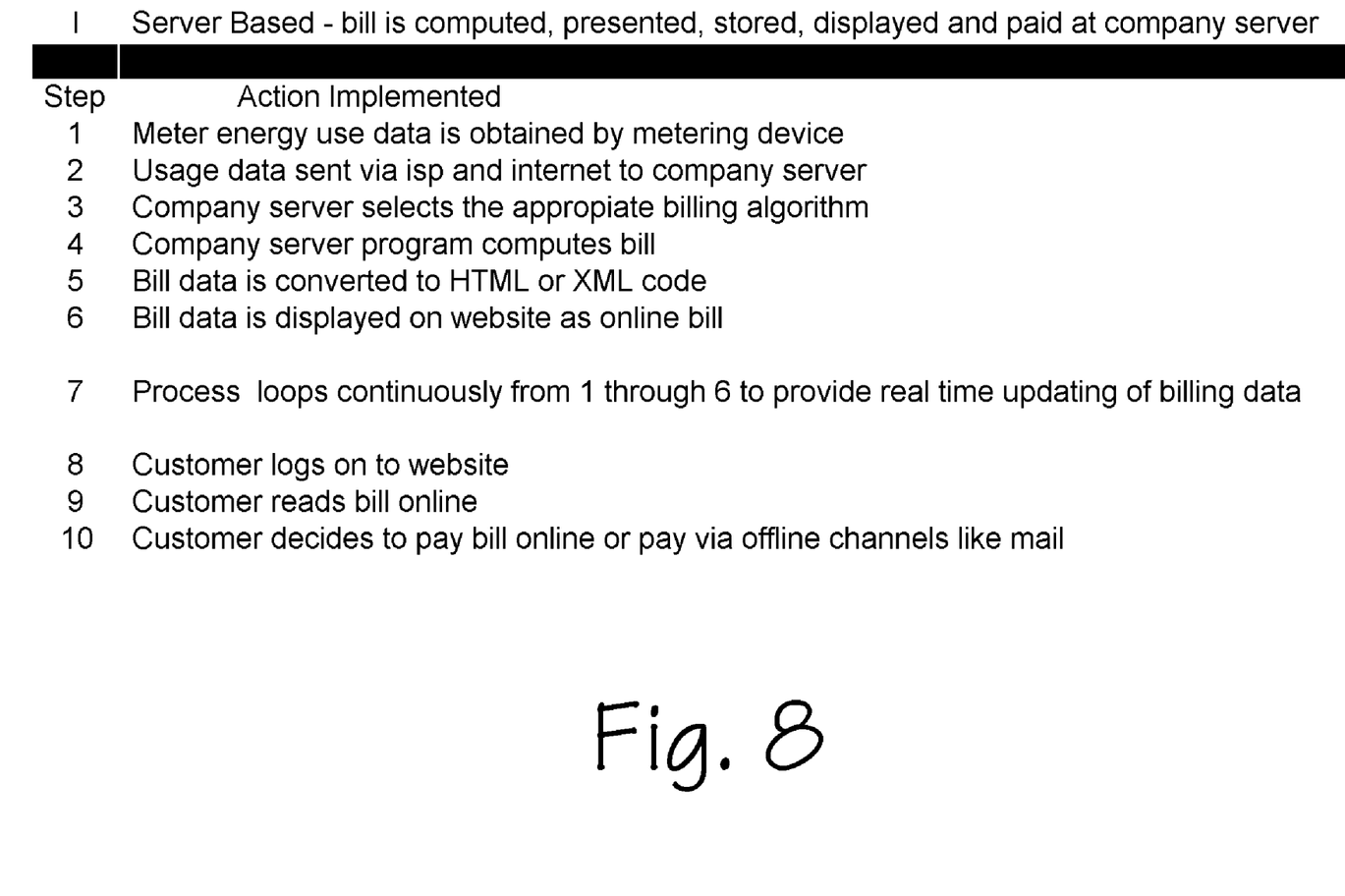
FIG. 8 describes a Server Mode of this invention.
Figure 9:
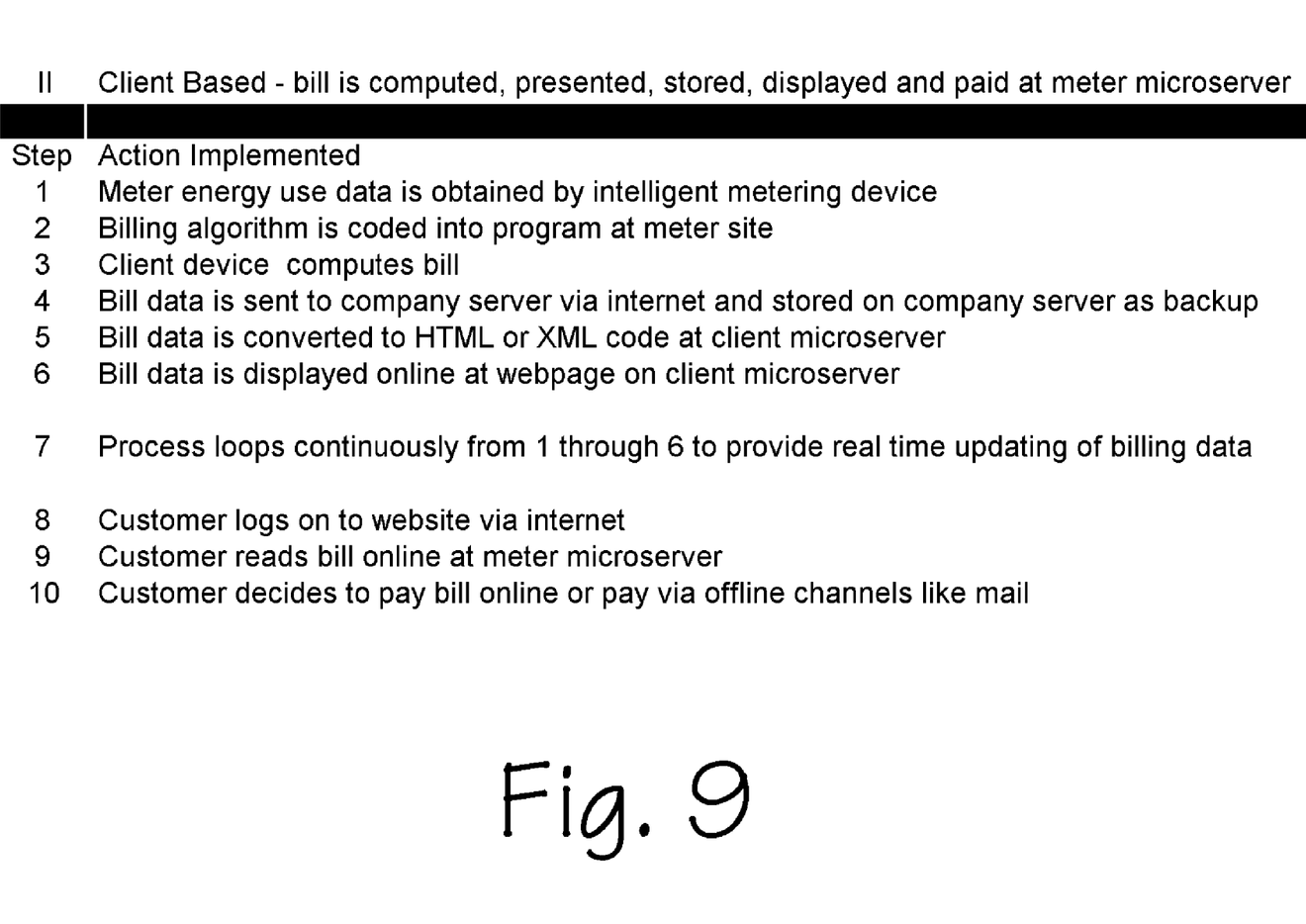
FIG. 9 describes a Client Mode of this invention.
Figure 10:
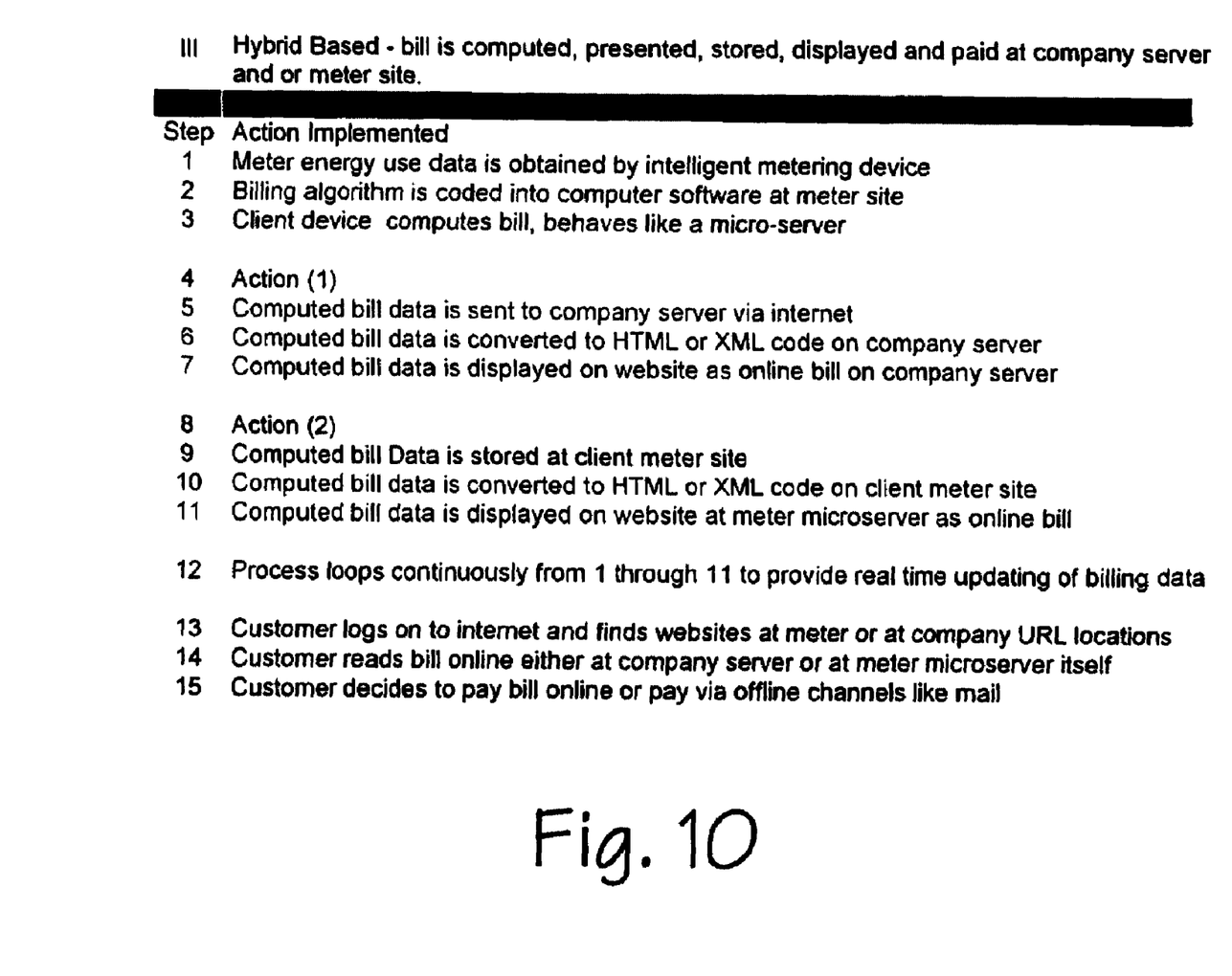
FIG. 10 describes a Hybrid Mode of this invention.

FIG. 7 shows the three embodiment modes of this invention. In the Server Mode, the meter device reads the energy data and sends the information to the server where the billing is computed, presented, and displayed, and payment made possible. In the Client Mode, an automatic meter reader (AMR) reads the energy data and computes the billing; the bill is presented, displayed, and payment may be made at the client's microserver. The meter itself in this embodiment functions as a computer microserver, albeit a small server, but with all the typical features of an internet server. The Hybrid Mode is a combination of the Server Mode and the Client Mode, where data is made available at both the meter micro-server site and at the company server simultaneously. Detailed steps for the Server Mode, the Client Mode, and the Hybrid Mode are shown in FIGS. 8, 9, and 10, respectively.

In all three modes, the bill is computed at the AMR. This is an advantage because it gives another level of backup and security. Utility computer systems can and do go down, but the AMR will still be operational because it operates independently of the utility computer system. The AMR can incorporate a card reader so that payment by credit card or debit card may be made at the AMR. Access to the AMR may be protected by password, passcard, or other security measures, such as typing in a code on a cell phone. Also, the AMR customer can have a third party monitor his energy usage without having to rely upon the utility for this service. The AMR may also give an audible, visual or other type of alarm when pricing information changes, so that the customer can adjust his energy use if he wishes to.

This invention may be used with any utility service, including electric power, gas, water, and other types of utility commodities.

Figure 1:
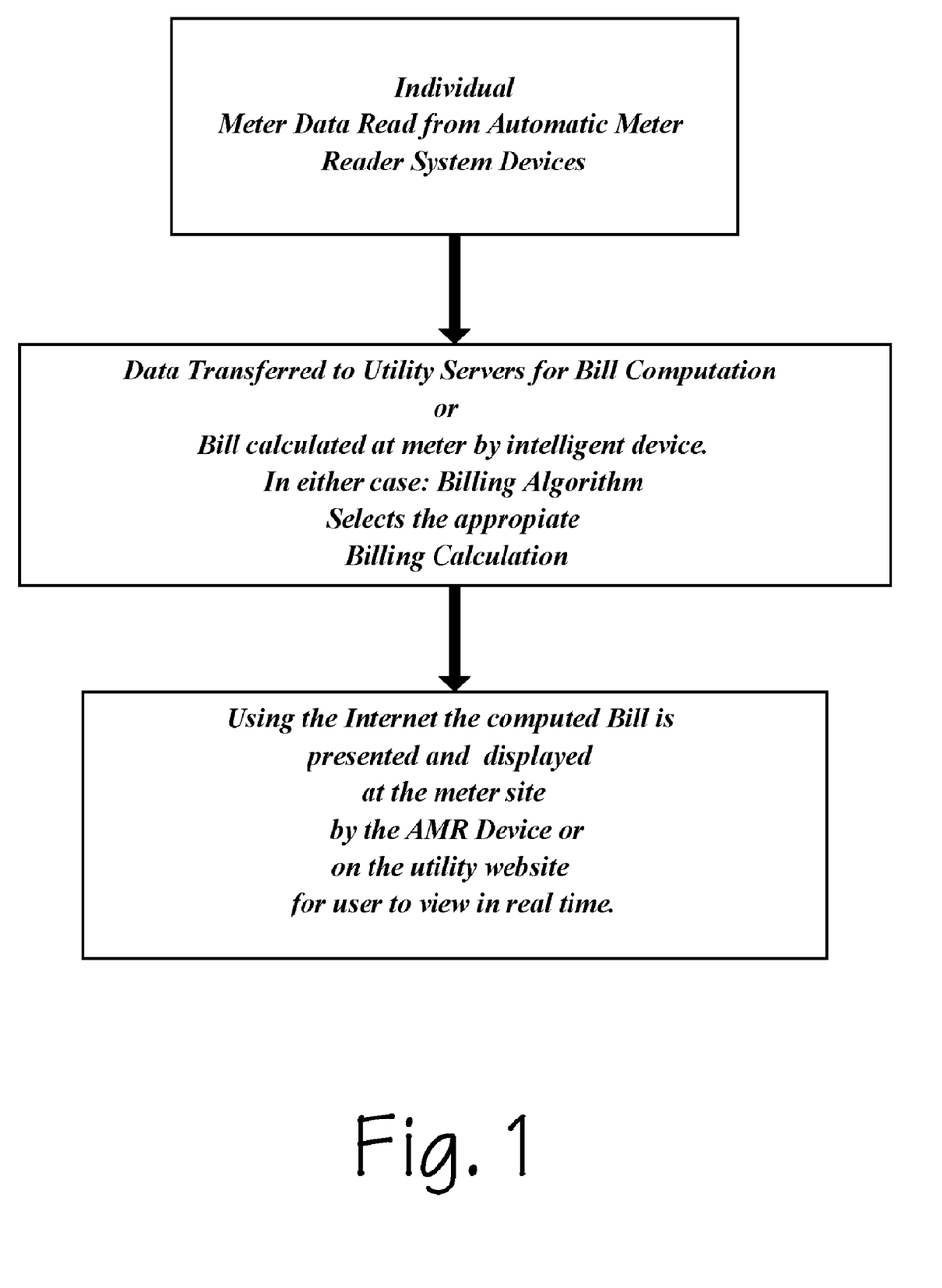
FIG. 1 is a block diagram illustrating a certain presently preferred embodiment of the process of this invention.

Referring to FIG. 1, there are three basic sequential phases involved in the application of the invention. In the first phase, the meter data is read or acquired by an automatic meter reader (AMR). An AMR is a commercially available device that generates continuous digital information of the power usage at the meter. The AMR includes a microprocessor that can store information and make calculations. In the next step, the meter data is either utilized at the AMR device or it is transferred to a remote server at the utility location, or both. The bill is computed by the AMR and may also be computed by the remote server. In the third step, the computed data is made available for display and payment either online, at the meter, or at both locations.

Figure 2:
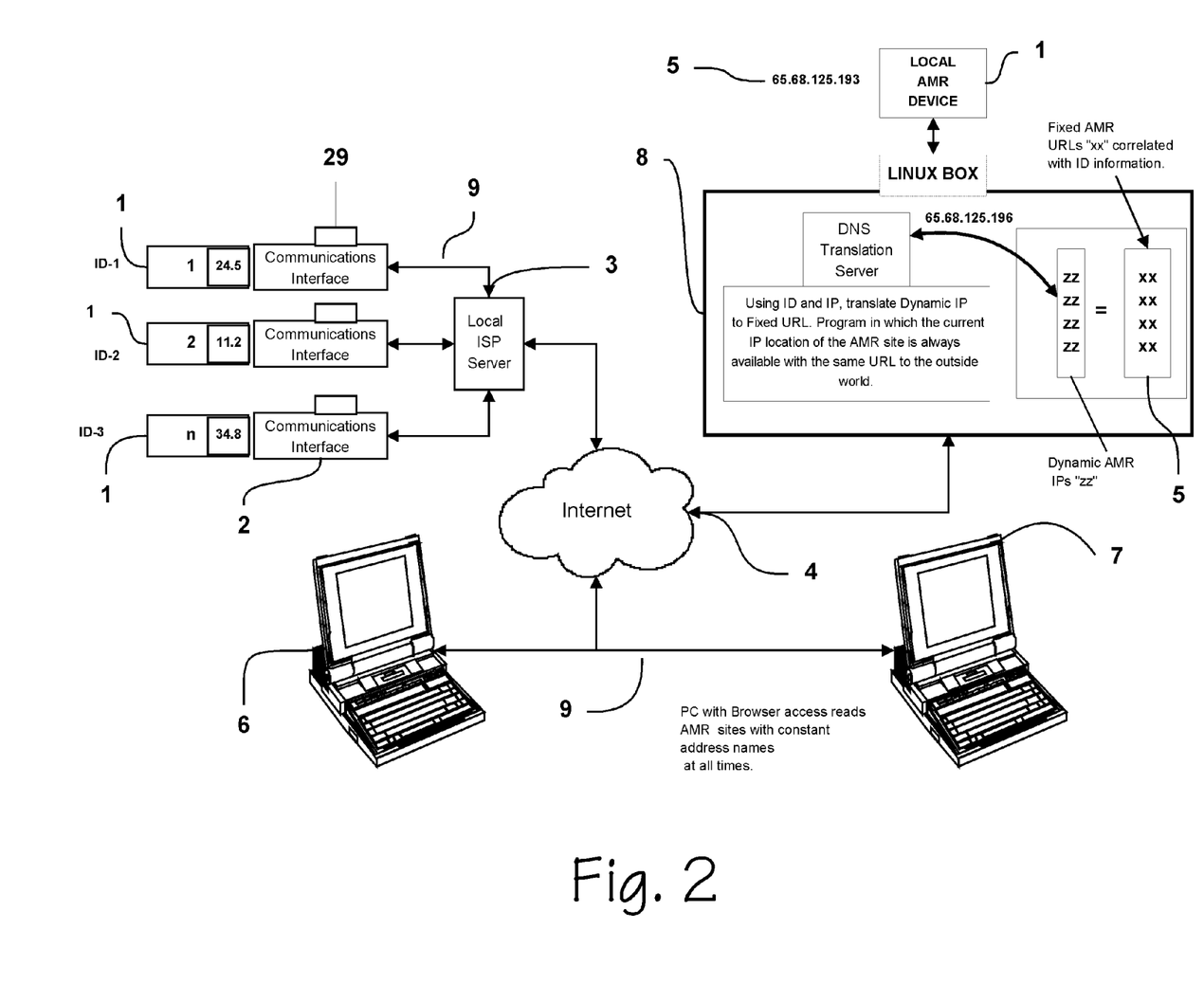
FIG. 2 illustrates the process of maintaining a single online computer address or URL for user to access the webpage.
Figure 3:
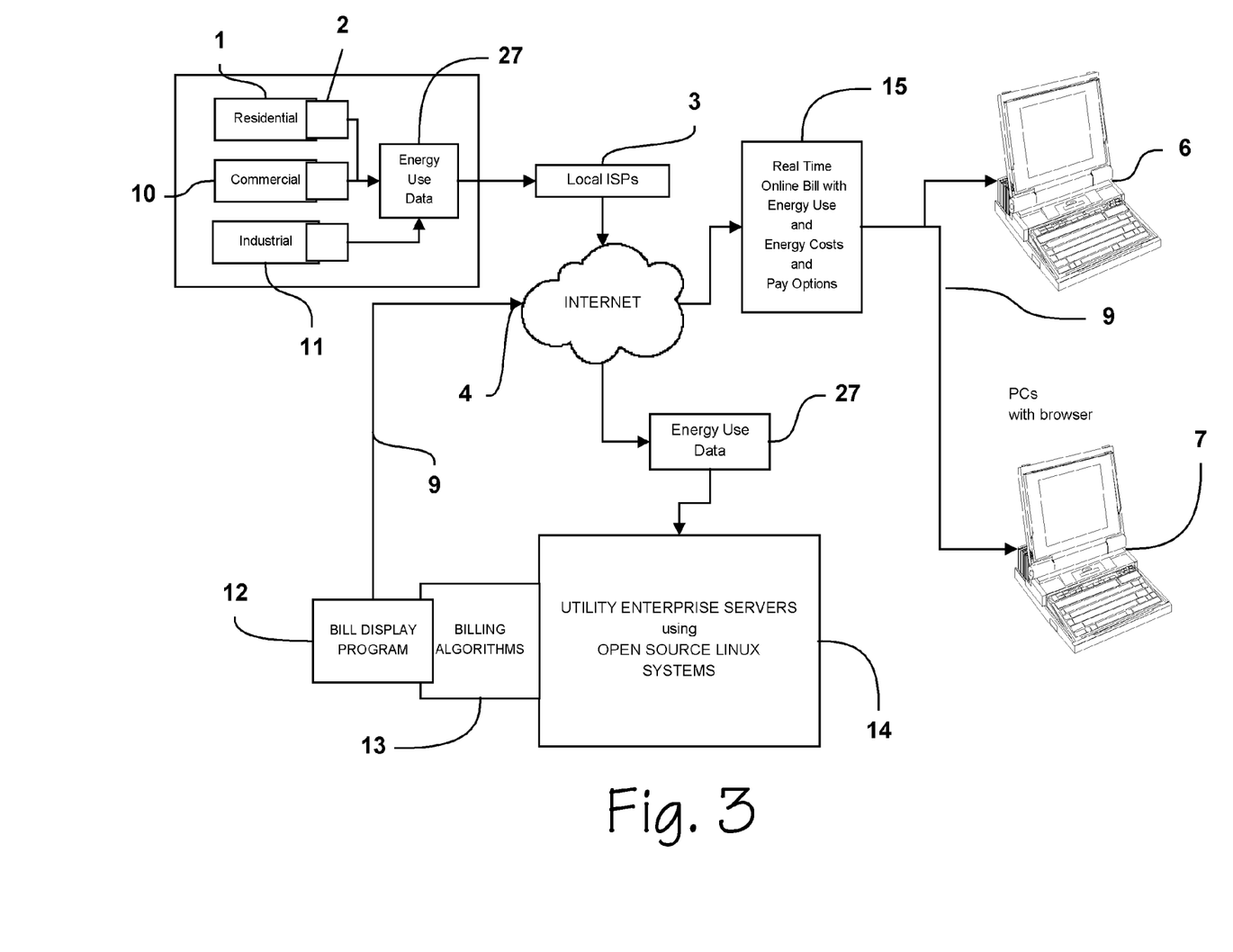
FIG. 3 is a diagram illustrating a billing process according to this invention, where utility servers are used to compute the online billing information.

Referring to FIGS. 2 and 3, there are three types of AMR devices, the residential AMR 1, the commercial AMR 10 and the industrial AMR 11. The AMR 1 may be connected in the field to either analog meters which are the older type meters or to digital meters which are newer and more sophisticated. A typical AMR 1 is connected by a communication interface 2 to an internet server provider (ISP) 3. The internet network 4 allows AMR 1, which is identified by a dynamic (i.e., it changes on every new logon), or static, (i.e., it never changes) internet protocol (IP) address 5, to be reached online through the internet or the world wide web (www), which is one of many networks on the internet. In one embodiment of the invention, AMR 1 may communicate directly with the utility system 14 without going through internet network 4 first. This may be accomplished, for example by means of a direct phone link or a wireless link, such as a radio link. A computer translation system 8, usually referred to in the information technology (IT) industry as a domain name service (DNS) translation, allows a dynamic translation of the current IP address 5 of AMR 1 to a fixed address maintained by the translation address server 8. This process allows the AMR to be always reached by the same unchanged internet identification (ID) at all times by the customers 6 and 7.

Referring to FIG. 3, the ISP 3 connects the AMR device 1 to the utility enterprise server 14. Software display programs 12 and billing algorithms 13 are resident in the utility servers 14. In one embodiment of the invention, these programs compute the billing data and display it at a utility website.

Figure 4:
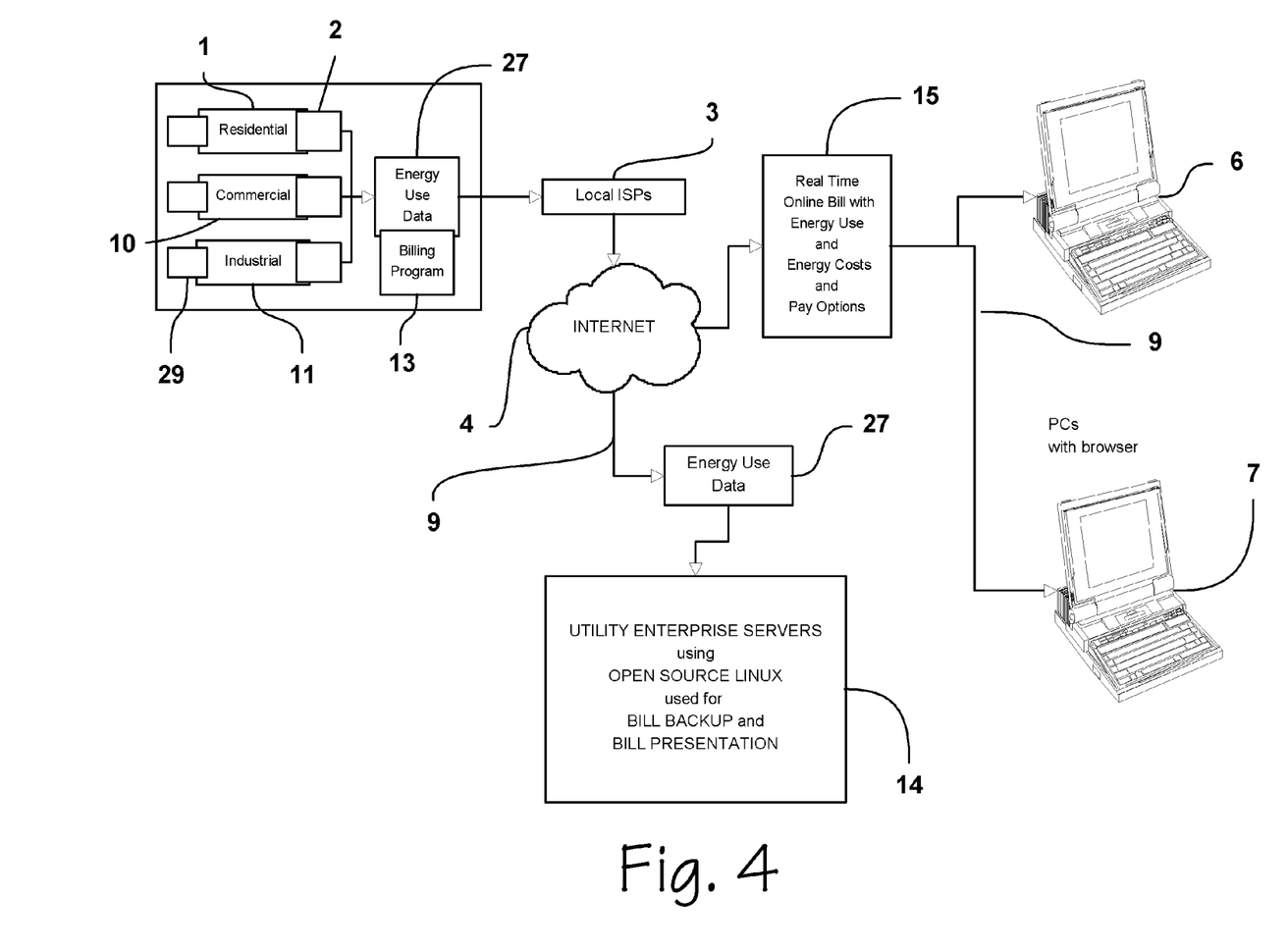
FIG. 4 is a diagram illustrating a billing process according to this invention, where an intelligent meter is used to compute the online billing information.

Referring to FIG. 4, in the Client Mode, the real time billing information 15 is computed at the meter device 1 using billing algorithm 13 which is part of the software embedded in micro-server device 1. This bill data and associated payment options 15 are then made available to customers 6 and 7 to review online with personal computers (PCs). In the Client Mode, illustrated by FIG. 4, the utility enterprise servers are used optionally for backup archiving and bill presentation.

Figure 5:
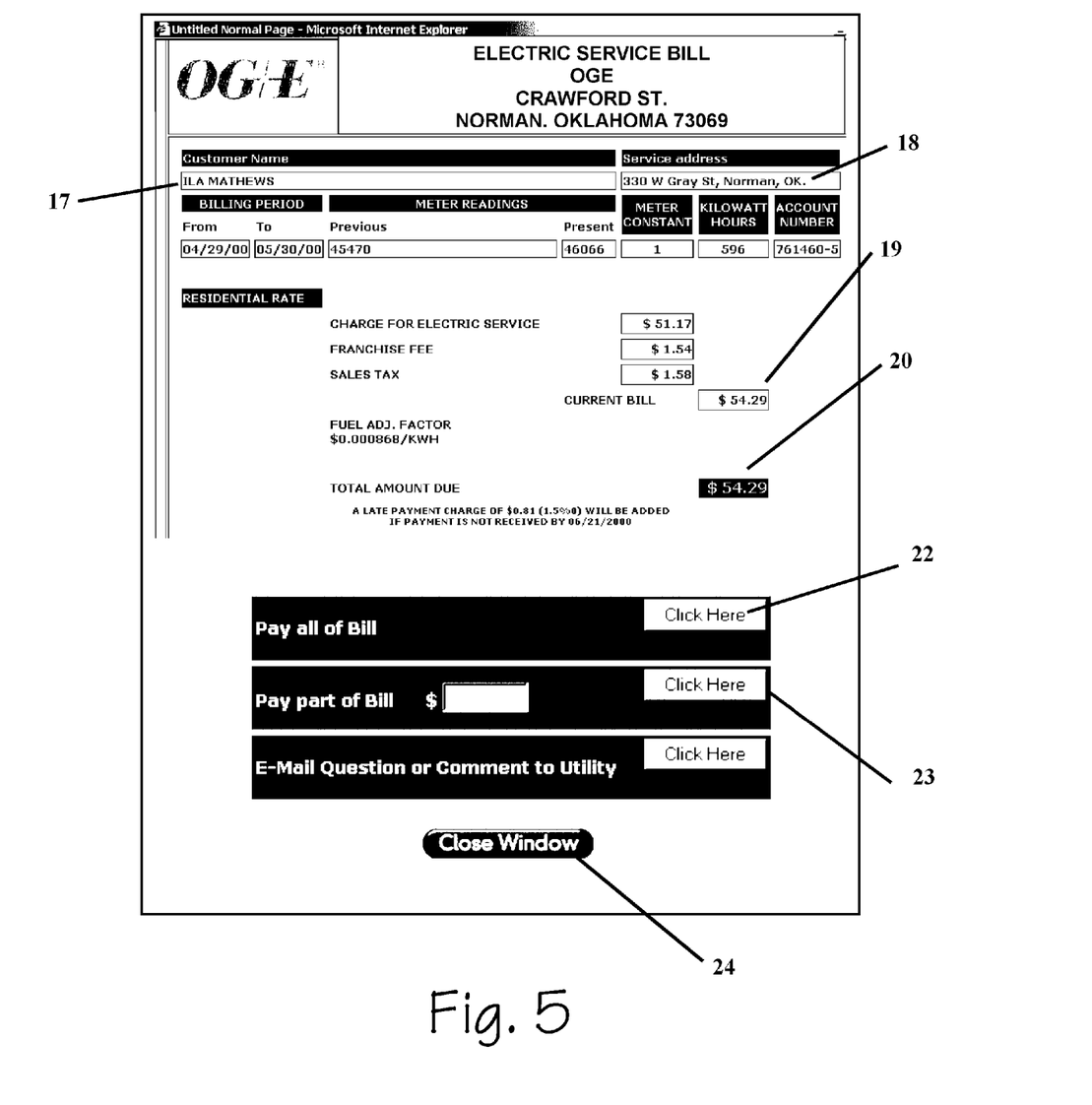
FIG. 5 shows a typical online electric bill displayed as a web page.

Referring to FIG. 5, the billing information, which is displayed either at microserver device 1, or optionally together at utility server 14, is in a web-enabled format suitable for display, such as HTML or XML. FIG. 5 depicts an example of an online bill that shows the customer name 17, the customer address 18, the quantity of energy 19, the total amount due 20, and the payment options 21, 22, and 23.

Figure 6:
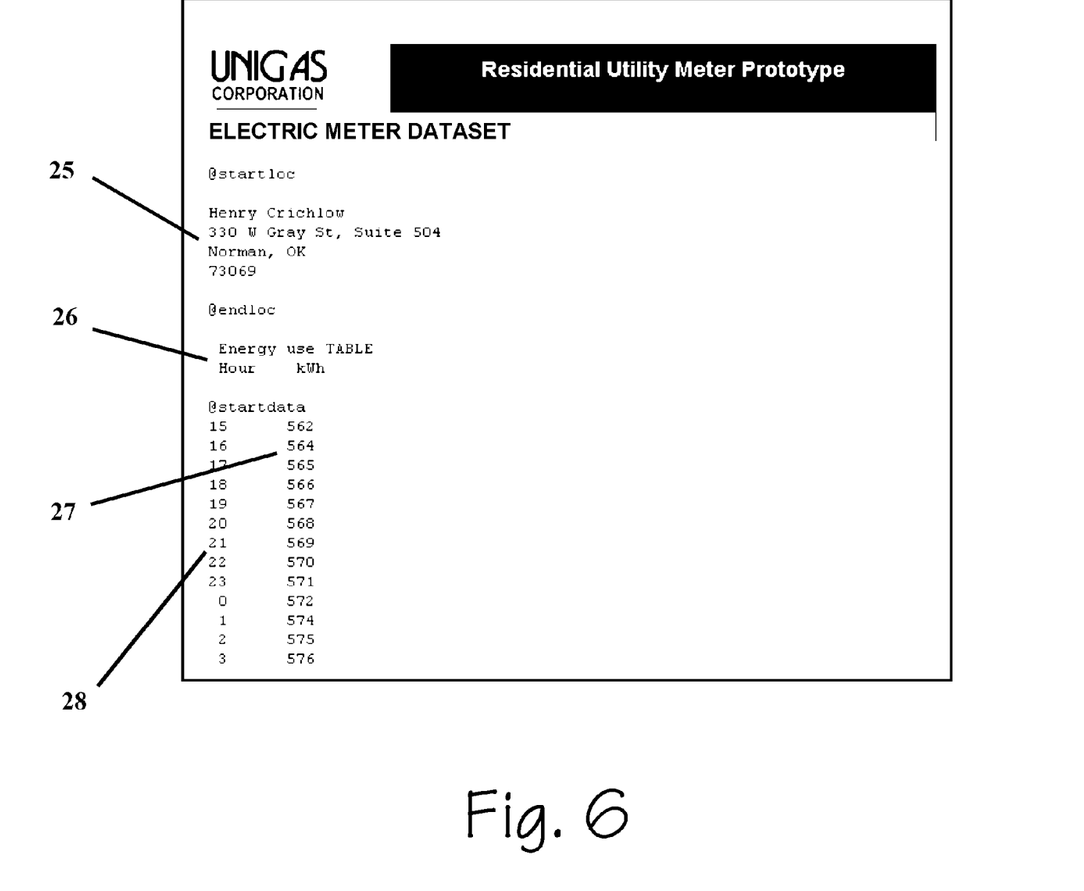
FIG. 6 shows the energy use data displayed online as a web page.

FIG. 6 gives an example of the type of data that may be displayed in a web page at AMR 1. The data identifies the device location and the types of information that are displayed. In this example, the display includes the AMR device ID, meter specific data, customer data such as the physical address of meter 25, the energy types descriptors 26, and the tabular data showing the energy usage 27 and the time stamp 28, which gives the hour as a number from 1 to 24, starting at midnight.

FIG. 7 illustrates the three possible modes for operating this invention. In the Server Mode, the AMR device 1 reads the energy data and sends this data to the utility server 14 which then computes and displays the energy usage data online at the utility's server 14. In the Client Mode, the AMR device 1 reads the energy data, computes the billing information, and displays the data as a webpage at the AMR device 1 itself. In the Client Mode, the AMR device behaves as a micro-server. Finally, in the Hybrid Mode, the invention operates as a hybrid which combines both the Server Mode and the Client Mode and the data is available at both the utility server and the AMR device simultaneously.

Figure 11:
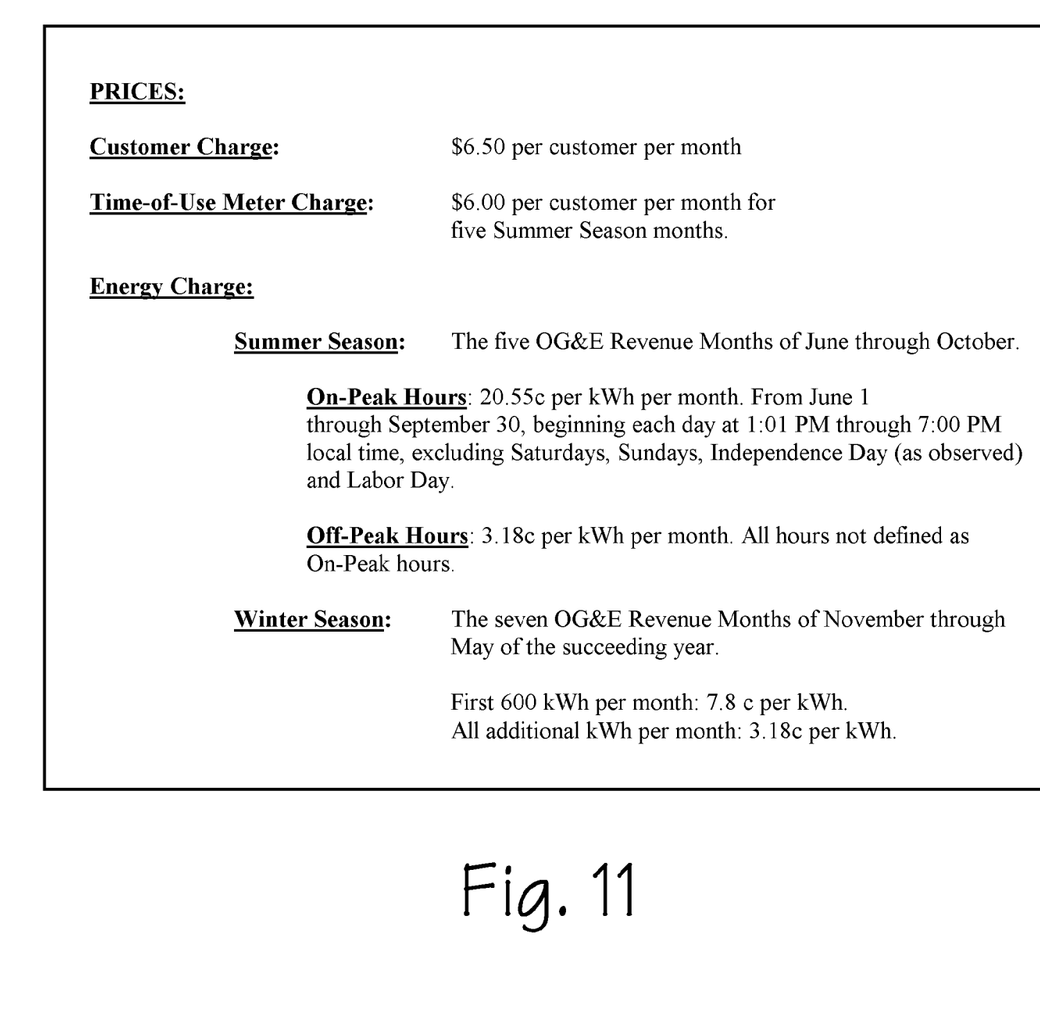
FIG. 11 shows a typical residential billing algorithm.

Referring to FIG. 8, the Server Mode is described by the following steps:
1. The meter data is read by AMR 1.
2. The energy use data 27, is sent via the ISP 3 and internet 4 to the company server 14.
3. The company server 14 selects the appropriate billing algorithm 13, an example of which is shown in FIG. 11.
4. The company server 14 computes the bill 15 using a calculation process similar to that shown in FIG. 12.
5. The bill data 15 is converted into a web enabled format including but not limited to HTML or XML code.
6. The bill data 15 is displayed on the utility website as an online bill.

7. The process loops continuously from step 1 through 6 to provide real time updating of bill data for all AMR devices connected to each specific utility server and saving the data in a relational database.
8. The customers 6, 7 log on to the website.
9. The customer 6 reads the bill online using standard browsers, ftp, email or other communicative formats.
10. The customer pays the bill 15 online or pays the bill offline via other channels like the mail.

Referring to FIG. 9, the Client Mode is described by the following steps:
1. The meter data is read by AMR 1.
2. The energy use data 27, is stored at AMR 1.
3. The billing program 12 is part of the software installed at AMR 1.
4. AMR 1 computes the bill data 15 using a calculation process similar to that shown in FIG. 12.
5. The bill data 15 is converted into web enabled format including but not limited to HTML or XML code.
6. The bill data 15 is displayed as a webpage as shown in FIG. 6 at AMR 1 available for viewing online.
7. The bill data 15 is transferred via the internet to the utility enterprise server 14 where the data is available for archival and backup purposes in relational databases.
8. The customers 6 logs on to the internet to view the bill.
9. The customer 6 reads the bill similar to the example shown in FIG. 5 online using standard browsers, ftp, email, or other communicative formats.
10. The customer pays the bill 15 online or pays the bill offline via other channels, such as the mail.

Referring to FIG. 10, the Hybrid Mode is a combination of the Server Mode and the Client Mode simultaneously, where both locations provide all the information related to the computation and display of the AMR data. The following steps describe the Hybrid Mode:
1. The meter data is read by AMR 1.
2. The energy use data 27 is stored at AMR 1.
3. The billing program 12 is also part of the software installed at AMR 1.
4. AMR 1 computes the bill data 15 using a calculation process similar to that shown in FIG. 12.
5. The energy usage data 27 is transmitted to the utility server 14 and stored.
6. The computed data is 15 is stored at the utility server 14 and also stored at AMR 1.
7. The real time bill data 15 is then displayed at the IP address 5 of AMR 1.
8. The data available at the utility server 14 is a compilation of data from all AMR devices under control by this particular server. The server loops through all the AMR devices until all the meter information is collected and finally archived in relational databases.

A typical customer billing algorithm used by a utility company is shown in FIG. 11.

Figure 12:
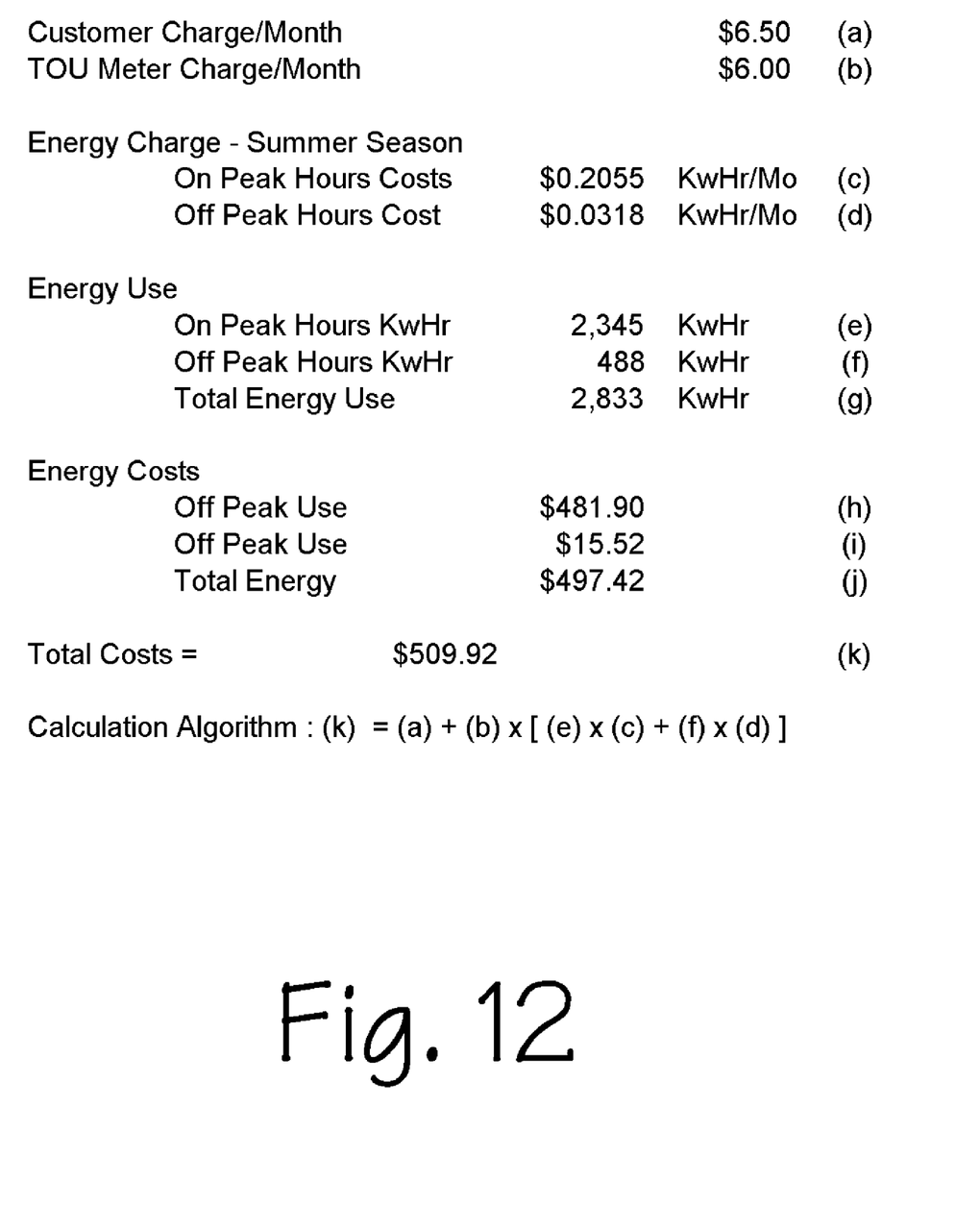
FIG. 12 shows a calculation procedure for a typical bill.

An example of the procedure for calculating a published utility bill for a residential customer with typical usage numbers is shown in FIG. 12.

Figure 13:
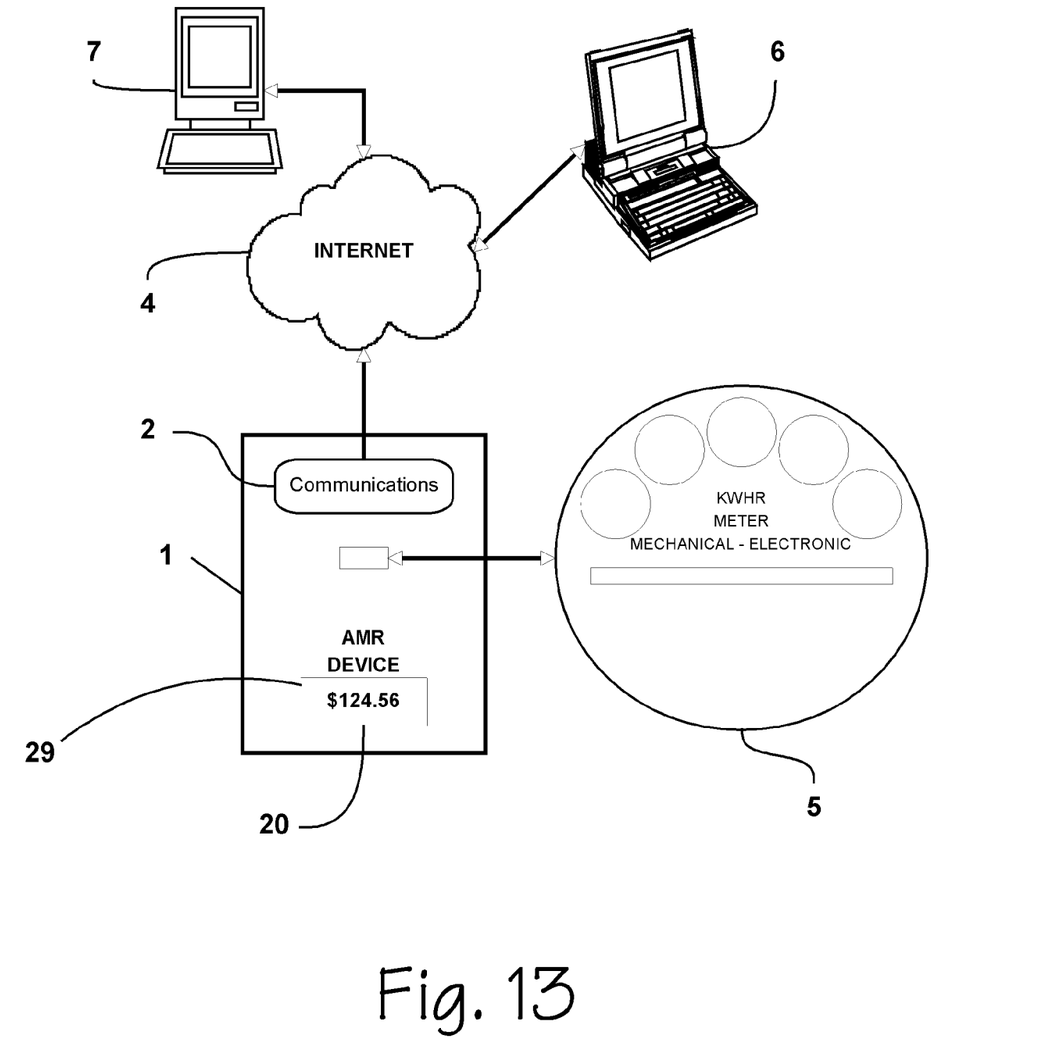
FIG. 13 shows a system with a visual liquid crystal display (LCD) window to provide information to the customer.

FIG. 13 shows a system with a visual liquid crystal display (LCD) window to provide information to the customer.

Although the present invention has been described in terms of various embodiments, it is not intended that the invention be limited to these embodiments. Modifications within the spirit of this invention will be readily apparent to those skilled in the field. For example, since the billing data is available on a microserver connected to the internet in real time, various means of interaction from email, to file transfer protocols (FTP) and other communicative processes can be used to access update and transfer the billing data.

The invention claimed is:

1. A system located at a meter site in communication with an internet site of a utility company that sells a utility commodity, said system comprising
    (A) an automatic meter reader that includes a microprocessor and, independently of said internet site, provides and stores real time information on the amount of said utility commodity used at said meter, calculates the cost of said amount, and displays said information and said cost at said meter site; and
    (B) a microserver for sending information between said automatic meter reader and said internet site, whereby said utility company sends pricing information to said automatic meter reader and, using said pricing information, said automatic meter reader calculates the cost of said utility commodity and sends said cost and amount used to said internet site.

2. A system according to claim 1 wherein plurality of said systems are in communication with said internet site.

3. A system according to claim 1 wherein payment is made at said internet site.

4. A system according to claim 1 including means for paying for said utility commodity at said automatic meter reader.

5. A system according to claim 1 wherein access to said automatic meter reader is protected by a password.

6. A system according to claim 1 wherein said utility commodity is electric power.

7. A system according to claim 1 wherein said automatic meter reader calculates said cost with a delay of less than 5 minutes.

8. A system according to claim 1 wherein said automatic meter reader displays said information and said cost in an LCD display window.

9. A system according to claim 1 wherein said automatic meter reader also communicates by means of a telephone line.

10. A system according to claim 1 wherein said automatic meter reader also communicates by means of a wireless connection.

11. A system according to claim 1 wherein said system and said internet site also communicate by means of a direct phone link or a wireless link.

12. A system according to claim 1 wherein said system includes a means for maintaining an unique IP address for said automatic meter reader, whereby said automatic meter reader is reached online with the same ID regardless of the internet logon ID.

13. A system according to claim 1 wherein information about the amount of said commodity used is sent via an internet server provider and the internet to said utility company server, said server selects a billing algorithm and computes a bill, and said bill is converted to a web-enabled format and is displayed on a utility company website as an online bill, the above process loops continuously thereby providing real time updating of said bill.

14. A system according to claim 1 wherein said automatic meter reader computes a bill and said bill is converted into a web-enabled format and is displayed as a webpage on the internet.

15. A system according to claim 1 wherein said automatic meter reader computes a bill that is transmitted to the server of said utility company.

16. A system according to claim 1 wherein said automatic meter reader includes a card reader for credit or debit card payment of said bill.

17. A system according to claim 1 wherein said automatic meter reader sets off an alarm when said pricing information changes.

18. A method of generating, displaying, and paying a utility bill using a system according to claim 1 comprising installing said system at a meter site.

19. A system according to claim 1 wherein said utility commodity is natural gas.

20. A system according to claim 1 wherein said utility commodity is water.

21. A system for providing real time information on the internet and at an electric power meter site of the amount of electric power used at that meter and its cost comprising
   (A) an internet site at which the power usage at said meter, the price of said power, and the charges for using said power at said meter can be viewed;
   (B) an automatic meter reader that includes a microprocessor and, independently of said internet site, provides and stores real time information on the amount of said utility commodity being used at said meter, calculates the cost of said amount, generating a bill, and displays said bill at said electric power meter;
   (C) means for paying said bill at said electric power meter; and
   (D) means for sending information between said automatic meter reader and said internet site, whereby said utility company sends pricing information to said automatic meter reader and, using said pricing information, said automatic meter reader calculates, in real time, the cost of said electric power usage at said meter and sends usage information including said cost, said amount, said bill, and any payment of said bill to said internet site where it is posted.

22. A method of generating, displaying, and paying a utility bill using a system according to claim 21 comprising installing said system at an electric power meter site.

23. A system for providing real time information on the internet and at an electric power meter site of the amount of electric power used at that meter and its cost comprising
   (A) an internet site at which the power usage at said meter, the price of said power, and the cost for using said power at said meter can be viewed;
   (B) an automatic meter reader that includes a microprocessor and, independently of said internet site, provides and stores continuous information on the quantity of said utility commodity being used at said meter, calculates the cost of said amount, generating a bill, and displays said bill at said electric power meter;
   (C) means for paying said bill at said electric power meter; and
   (D) means for sending information between said automatic meter reader and said internet site, whereby said utility company sends pricing information to said automatic meter reader and, using said pricing information, said automatic meter reader calculates the cost, in real time, of said electric power usage at said meter, posts said amount and cost at said meter, and sends usage information including said cost, said amount, said bill, and any payment of said bill to said internet site where it is also posted; and
   (D) means for directly communicating between said automatic meter reader and said utility company without communicating through said internet.

24. A method of generating, displaying, and paying a utility bill using a system according to claim 23 comprising installing said system at an electric power meter site.

\* \* \* \* \*